(No Model.)
J. P. RUNKEL.
DEVICE FOR AN ELECTRIC CAR SIGNAL.
No. 417,842. Patented Dec. 24, 1889.
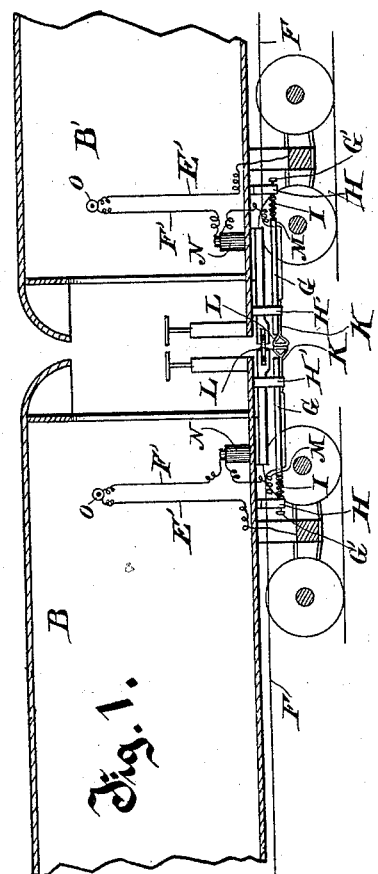
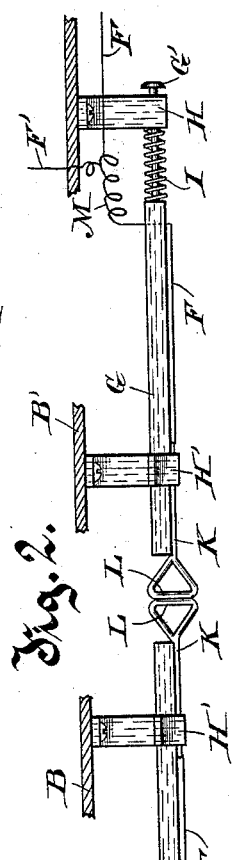
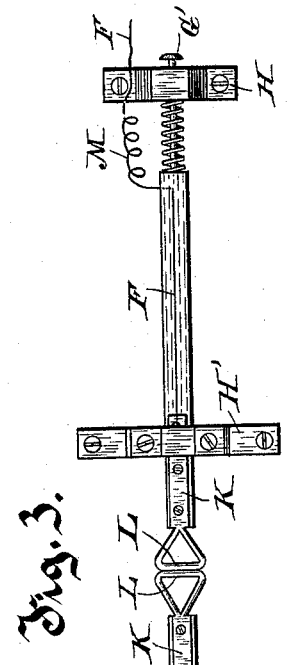
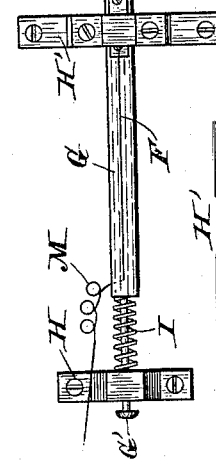
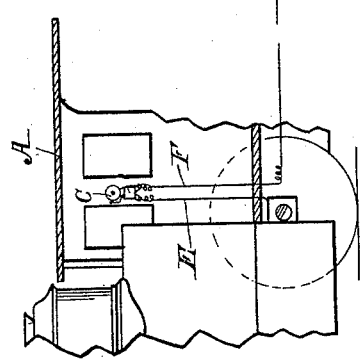
Witnesses.
C. H. Keeney,
Anna Faust.
Inventor.
John P. Runkel
By Ennu H Benedict
Attorneys.

UNITED STATES PATENT OFFICE.

JOHN P. RUNKEL, OF MILWAUKEE, WISCONSIN.

DEVICE FOR AN ELECTRIC CAR-SIGNAL.

SPECIFICATION forming part of Letters Patent No. 417,842, dated December 24, 1889.

Application filed February 19, 1889. Serial No. 300,488. (No model.)

*To all whom it may concern:*

Be it known that I, JOHN P. RUNKEL, of Milwaukee, in the county of Milwaukee and State of Wisconsin, have invented a new and useful Device for an Electric Car-Signal; and I do hereby declare the following to be a full, clear, and exact description of said invention, reference being had to the accompanying drawings, and to the letters of reference marked thereon, which form a part of this specification.

My invention is of a mechanical device whereby an electrical circuit is automatically and unfailingly made between the several cars of a train and the locomotive by coupling them together, whereby a telegraphic or telephonic signal may be transmitted from any car of the train to the locomotive, or whereby, when telephone transmitting and receiving instruments are used, a communication may be transmitted from the locomotive to the cars of the train.

In the drawings, Figure 1 is a longitudinal sectional view of a portion of the cab of a locomotive and of portions of two railway-coaches, showing my device in connection therewith, whereby its method of use is illustrated. Fig. 2 is a side elevation of the principal operative part of my device in detail, showing the means of securing it to the under side of a car. Fig. 3 is a plan or under side view of the same parts of the device shown in Fig. 2. Fig. 4 is an end view of that part of my device that is seen at one end of a car in connection with its supporting-bracket.

In the drawings, A is a portion of the cab of a locomotive, and B and B' are portions of two railway passenger-coaches. An electric signal-bell C, of ordinary construction, is secured to the side of the cab near the engineer, which bell is provided with a ground-wire E. Underneath each car at both ends thereof an endwise-sliding bar G is supported in brackets H H', which brackets are affixed rigidly to the under side of the floor of the car. Each of these bars G is provided near its rear end with a coiled-wire spring I, inserted between a bracket H and a shoulder or end proper of the bar G, whereby this bar is held yieldingly outwardly toward the end of the car.

The particular construction of the bar G shown in the drawings is that it extends in front of the bracket H' and only part way from the bracket H' to the bracket H, a pin G' being inserted in the rear end of the bar and extending rearwardly through the bracket H and forming a part of the endwise-moving bar G, about which pin G' the spring I is coiled. Rigidly secured to the under side of the bar G at its front end is a metal plate K, preferably composed largely of copper, which projects forwardly in front of the front end the bar G and terminates in an enlarged extremity or head L, the longer cross-axis of which is preferably set at an angle to the perpendicular of about forty-five degrees.

The heads L at the two ends of each car are set in different directions, so that when they come together, as they are adapted to do when the car is coupled, their faces will meet at right angles to each other. Thus in Fig. 4 the head L is shown located at an angle to the perpendicular, and as the two heads on each car face in opposite directions, and as both of them are inclined away from the perpendicular toward the right hand in the direction they severally face, it will be seen that when a rear end of one car comes together with the front end of another car the two heads will cross each other at right angles, this relation of the heads not being clearly seen in a plan or elevation of this device. This form and position of the heads L L on the two ends of the car are intended and adapted to insure the contact with each other of these heads when the cars are coupled together, and to obviate any possible escape therefrom by reason of any tilting or depression of one car more than another by reason of its load or the wear of its parts or otherwise.

The signal-wire F is connected so as to form an electric circuit with the plates K at both ends of each car, and as the wire F is flexible and may be provided with flexible coils M M the endwise movement of the bars G G will not interrupt or break the electrical circuit. These bars G G are so located and constructed with reference to the ends of the car that the heads L L project sufficiently beyond each car as surely to come in contact with each other when the cars are coupled together, as shown in Fig. 1. A branch signal-wire F' is connected with the main wire F and runs up into the car or coach through a small battery N, and terminates in a small metal plate secured to the side or floor of the car, against which plate a small metallic rod or push-button O is permitted to strike when thrust into contact therewith by the hand, which push-button and metal plate is in the form in common use for such purposes. The push-button is provided with a ground-wire $E'$, running to the journal-box or springs of the car, whereby it communicates through the metal running-works of the car with the ground.

It will be understood that by this form of construction a telegraphic signal or series of signals may be communicated from any car in the train provided with this device to the locomotive, and that if telephone receiving and transmitting apparatuses are used in connection with the signal-wire F, instead of the devices herein shown and described, telephone communication could be had between the cars and the locomotive or between the locomotive and the cars. It will also be understood that while the bars G in their normal positions are held so far forward as to insure the certain contact of the heads L L with each other when the cars are coupled together, by the springs I I they are held so yieldingly in such positions that they may be forced back so far as is necessary to provide for any movements of the cars with reference to each other, and at the same time to maintain a perfect contact of the heads L L with each other, and to thereby hold the electric circuit constantly complete. Such bars as the bar G must also be provided for the connection between the locomotive and its tender and between the tender and the cars, although these are not shown in the drawings, as they would be merely duplicates of the connections shown between the two cars in Fig. 1.

What I claim as new, and desire to secure by Letters Patent, is—

The combination, with a car, a sliding bar G, secured thereto on the under side, and an actuating-spring I, of a signal-wire F, a metal plate K, to which the wire is connected, and a head L, having a longitudinal face, the longitudinal faces of the heads of the plates at the two ends of the car being located at an angle to each other, so that when the heads L L on two cars come together they will meet each other at right angles, substantially as and for the purpose set forth.

In testimony whereof I affix my signature in presence of two witnesses.

JOHN P. RUNKEL.

Witnesses:
C. T. BENEDICT,
ANNA FAUST.